D. A. MESSNER.
TIRE.
APPLICATION FILED JUNE 21, 1915.
1,233,278.
Patented July 10, 1917.
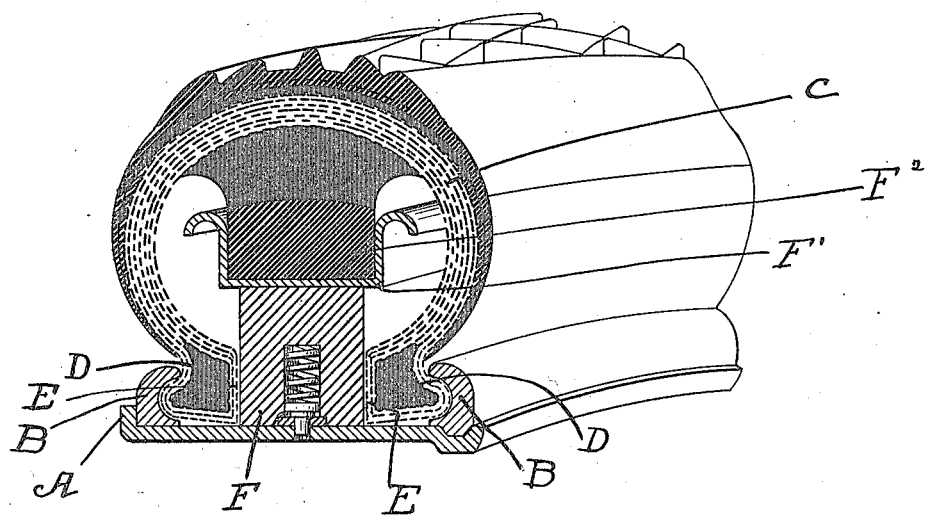

UNITED STATES PATENT OFFICE.

DAVID A. MESSNER, OF AKRON, OHIO, ASSIGNOR OF ONE-THIRD TO SAMUEL A. MESSNER, OF AKRON, OHIO.

TIRE.

1,233,278.  Specification of Letters Patent.  Patented July 10, 1917.

Application filed June 21, 1915. Serial No. 35,279.

*To all whom it may concern:*

Be it known that I, DAVID A. MESSNER, a citizen of the United States, residing at Akron, in the county of Summit and State of Ohio, have invented certain new and useful Improvements in Tires, of which the following is a specification.

My invention relates to improvements in tires, and refers particularly to what are known as cushion tires.

One object of my invention is the provision of a tire which will possess the necessary resiliency but which will be absolutely proof against puncture, thus insuring a tire which will have a long life and prove highly desirable and efficient.

Another object of my invention is the provision of a tire capable of supporting a very heavy load which will be absolutely proof against lateral or side motion under all conditions, and which will be inexpensive and thoroughly practical in every respect.

With these objects in view my invention consists of a tire, embodying a casing or shoe, a supporting rib and means for bracing and retaining the rib in position under all circumstances.

The invention also consists of a tire of the type stated embodying novel features of construction and combination of parts for service substantially as shown and particularly defined by the claim.

The single figure represents a view in section and perspective of a tire constructed in accordance with and embodying my invention.

The letter A, designates the rim of the wheel and B designates the clenching or fastening rings in connection with which my tire is particularly adapted for use.

The tire consists of the shoe or casing C, of composite construction, formed with the outer heads D, having the inner flat faces E, which normally lie contiguous to the sides or faces of the central supporting wood base strip F extending longitudinally around the rim.

This base strip is made of wood and forms the base or support for the metal channeled strip F', which receives the rib F² of rubber of the proper resiliency, integral with and extending from the wall of the casing to the support to provide a support of the desired resiliency and most efficient character, being seated in the metal channeled ring or band F'.

As will be readily understood, the curving of the rib F² at its junction with the casing to correspond with the laterally curved flanges G formed on the outer edges of the channeled strip F', prevents injury to the tire when a hard blow is received.

From this construction it will be noted that the tire is clamped or secured upon the rim and that the wood supporting strip is secured by the casing and its fastening means.

It will thus be seen that I provide a tire which dispenses with the inner tube and which cannot be affected by punctures or injury; which possesses the necessary elasticity and will support a heavy load; which will prevent side or lateral movement and avoid skidding; and which generally is efficient, reliable and practical.

The vital and important feature of my invention resides in the casing with rib and lateral flanges in combination with the supporting and sustaining or retaining means which act jointly to produce the best results under all conditions.

It will also be apparent that my tire will prove desirable for service upon trucks, fire engines, or other heavy vehicles by reason of the fact that its construction will sustain a heavy load and with the necessary spring or elastic action.

I claim:

In a tire, the combination with a rim, of a casing formed with a centrally disposed rib extending inwardly therefrom toward the rim, a support for said rib, comprising a base strip and a channeled strip carried thereby for receiving said rib, said channeled strip having its outer edges curved laterally and said rib being curved at its junction with the casing to conform with said laterally curved edges to prevent injury thereto when a hard blow is given the tire, and means carried by the base strip for engaging an opening in the rim to prevent its slipping longitudinally around the rim.

In testimony whereof I affix my signature in the presence of two witnesses.

DAVID A. MESSNER.

Witnesses:
 DAVID I. EVANS,
 W. F. WOTRING.